United States Patent [19]

Shumate

[11] Patent Number: 4,772,769
[45] Date of Patent: Sep. 20, 1988

[54] APPARATUS FOR SELECTIVE BACKLIGHTING OF KEYS OF A KEYBOARD

[75] Inventor: William G. Shumate, Tempe, Ariz.
[73] Assignee: Burr-Brown Corporation, Tucson, Ariz.
[21] Appl. No.: 12,210
[22] Filed: Feb. 6, 1987
[51] Int. Cl.$^4$ ............................................. H01H 9/18
[52] U.S. Cl. .................................... 200/314; 200/317
[58] Field of Search ............... 200/314, 317, 313, 310, 200/DIG. 47

[56] References Cited

U.S. PATENT DOCUMENTS

| | | | |
|---|---|---|---|
| 2,285,374 | 6/1942 | Dohsmann et al. | 116/124.1 |
| 3,144,643 | 8/1964 | Andersson | 340/380 |
| 3,163,739 | 12/1964 | Hutt | 200/167 |
| 3,755,661 | 8/1973 | Bouvrande | 240/2 S |
| 4,024,368 | 5/1977 | Shattuck | 200/314 |
| 4,104,981 | 8/1978 | Ono et al. | 200/313 |
| 4,218,775 | 8/1980 | Cox et al. | 455/344 |
| 4,288,672 | 9/1981 | Puccini | 200/314 |
| 4,343,975 | 8/1982 | Sado | 200/314 |
| 4,365,120 | 12/1982 | Pounds | 200/314 |
| 4,385,221 | 5/1983 | Dorfler | 200/314 |
| 4,449,024 | 5/1984 | Stracener | 200/317 |
| 4,489,227 | 12/1984 | Lamarche | 200/314 |
| 4,493,958 | 1/1985 | Hamilton et al. | 200/314 |
| 4,531,033 | 7/1985 | Schmid et al. | 200/314 |
| 4,551,598 | 11/1985 | Hamilton et al. | 200/314 |

FOREIGN PATENT DOCUMENTS

| | | |
|---|---|---|
| 2837209 | 3/1980 | Fed. Rep. of Germany. |
| 3535217 | 4/1986 | Fed. Rep. of Germany ...... 200/314 |
| 2149353 | 6/1985 | United Kingdom. |

Primary Examiner—Renee S. Luebke
Attorney, Agent, or Firm—Cahill, Sutton & Thomas

[57] ABSTRACT

An apparatus for selective backlighting individual transluscent keys of a terminal keyboard includes a horizontal, double-sided printed circuit board having a number of right angle LEDs equal to the number of backlit keys mounted on its bottom surface. A plurality of clearance holes in the printed circuit board admit a plurality of vertical light pipes that are integral with a transparent substrate. Integral alignment bosses on a bottom surface of the substrate fit precisely in corresponding holes of the printed circuit board. Each light pipe has a rectangular cross section and a 45 degree inclined bottom surface. A horizontal light beam emitted by a LED passes through a vertical wall of a light pipe, strikes its inclined bottom surface, and is reflected up through the light pipe into a recess within a key. The substrate supports a rubber sheet in which the keys are molded and a switch contact layer with printed conductors thereon. Depression of a key presses a conductive shorting pad against the printed conductors, actuating a switch.

21 Claims, 2 Drawing Sheets

APPARATUS FOR SELECTIVE BACKLIGHTING OF KEYS OF A KEYBOARD

BACKGROUND OF THE INVENTION

The invention relates to electrical keyboards, and more particularly to apparatus for selective backlighting individual keys of electrical keyboards.

A wide variety of keyboards are utilized for data entry terminals and remote control terminals. Some state-of-the-art keyboards are quite complex, as the keys often are designed to provide tactile feedback to the user to assure him or her that electrical contact has been made by depression of the key. In many cases, it is desirable to have a particular selected key illuminated at certain times, for example, to indicate when the key has been properly depressed, or to indicate the status of a function controllable by the key.

Perhaps the state-of-the-art in backlit keyboards is best indicated in U.S. Pat. Nos. 4,288,672, 4,343,975 and 4,489,227. U.S. Pat. No. 4,489,227 shows a horizontal substrate with a plurality of vertical light pipes that each extend upward from an integral horizontal substrate into a transparent key. A common light source feeds light from an external source into the substrate, which guides the light into all of the light pipes, thereby simultaneously illuminating all of the keys. A foam overtravel pad rests on the horizontal support plate. The overtravel pad includes apertures that admit the light pipes. A membrane switch supported by the overtravel pad also includes apertures that allow the light pipes to pass through. U.S. Pat. No. 4,288,672 shows a structure in which a common light source produces light that is reflected by sloped surfaces on the bottoms of light pipes that extend upward through a circuit board assembly. U.S. Pat. No. 4,343,975 discloses a system in which light from a common remote source is routed through an optical conductor to various transparent keys.

The backlit keyboard systems disclosed in the foregoing patents do not allow selective backlighting of individual keys, nor do the patents show how practical, economical manufacture of a keyboard with selectively backlit keys can be accomplished.

Yet, another prior structure provides individual light emitting diodes that are mounted on the bottom surface of a printed circuit board and extend upward through openings in the printed circuit board into very shallow, transluscent 5 mil thick key caps to backlight the key caps. That technique is practical only if the key cap material is very thin. However, most key caps that are molded integrally from rubber-like sheets must be so thick that they cannot transmit enough light from light emitting diodes mounted in this manner.

Those skilled in the art know that in order to accomplish economical manufacture of a printed circuit board using conventional wave soldering techniques, all of the components, including light emitting diodes, must be mounted on one side of the printed circuit board. At the present state-of-the-art, any practical technique for providing backlit keys should provide all components on the "bottom" surface of the printed circuit board to be able to use the conventional wave soldering techniques.

Thus, there remains an unfulfilled need for an economically manufacturable keyboard with selectively backlit keys.

SUMMARY OF THE INVENTION

Accordingly, it is an object of the invention to provide a keyboard with selectively backlit keys, which keyboard can be econmically manufactured using conventional wave soldering techniques.

It is another objective of the invention to provide a keyboard with selectively back lit keys, wherein all components, including light sources, are mounted on the bottom side of a printed circuit board beneath the keys using wave solder manufacturing techniques.

Briefly described, and in accordance with one embodiment thereof, the invention provides an apparatus and technique for selectively illuminating individual keys of a keyboard including a plurality of relatively thick transparent or transluscent key caps, each of which includes a cavity receiving a respective vertical light pipe that is supported by and integral with a transparent substrate. The light pipes each extend both upward from the transparent substrate into the cavity of an individual key cap and downward through clearance holes in a printed circuit board to receive light from a corresponding light emitting diode mounted on the bottom surface of the printed circuit board. The substrate also includes alignment bosses extending into alignment openings in the printed circuit board. The key caps are molded with a sheet of flexible plastic. Closed bosses on the inner top surface of the housing press down on the portion of the upper surface of the flexible plastic sheet around each key cap, sealing out moisture and dust. A housing with openings through which the key caps extend is attached to a rear cover, the rear cover including pedestals on which the bottom surface of the printed circuit board rests. Each key cap when depressed forces a conductive shorting pad against two spaced electrical contacts on a switch contact layer. The transparent substrate therefore not only supports the light pipe, but also the plastic sheet out of which the key caps are molded, the switch contact layer, the force exerted by the sealing bosses against the flexible plastic sheet, and any forces applied to the caps to depress them.

DESCRIPTION OF THE INVENTION

Figure 1:
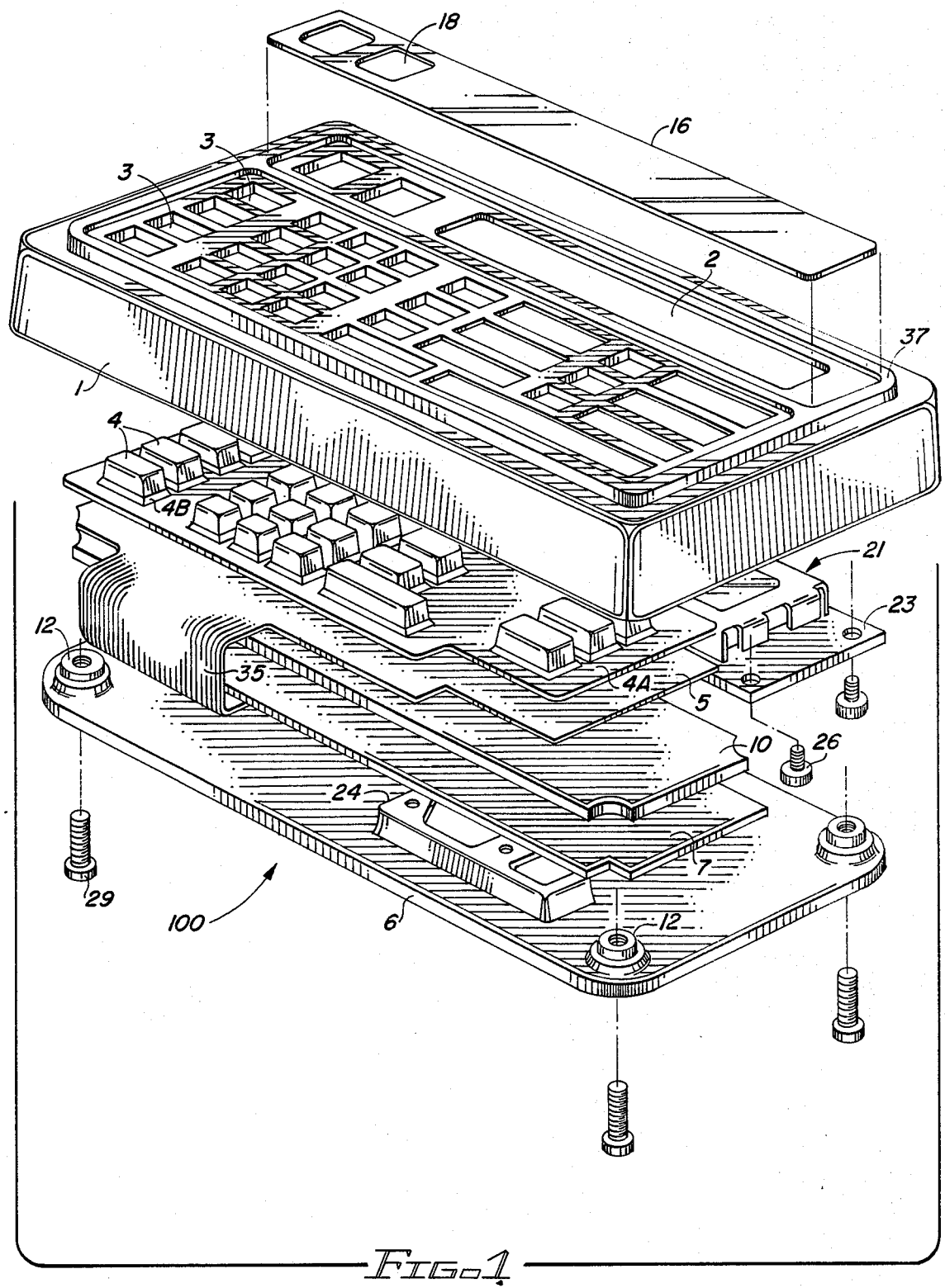
FIG. 1 is an exploded perspective view of a terminal including the backlit keyboard of the present invention.

Referring now to the drawings, microterminal or keyboard 100 includes a plastic housing 1 having an upper surface with an opening 2 therein for exposing the surface of a liquid crystal display (LCD) unit 21 (FIG. 1) contained inside housing 1. In FIG. 1 plate 23 is the back of LCD display 21, and is attached thereto by means of screws 26. The upper surface of housing 1 includes a plurality of apertures 3 through which a plurality of keys or "key caps" 4 extend. The key caps 4 are composed of flexible molded rubber or like plastic material and are supported on and integral with a flexible base sheet 4A. Each of the key caps 4 includes a closed, flexible flange 4B by means of which it is connected to the base sheet 4A.

Figure 2:
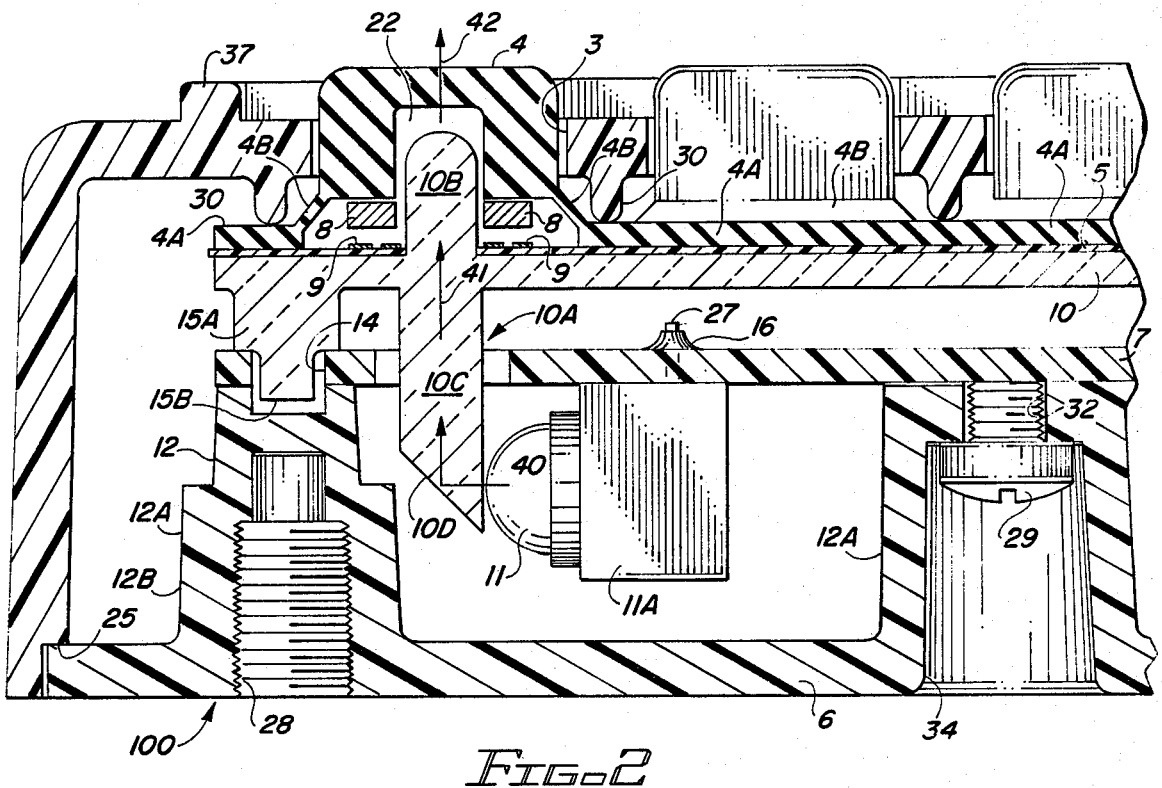
FIG. 2 is a partial section view of the keyboard of FIG. 1.

As shown in FIG. 2, a plurality of closed bosses 30 extend from the upper inner surface of housing 1 and press against the upper surface of base sheet 4A. A closed boss 30 surrounds each key cap 4, sealing out moisture and dust.

The base sheet 4A rests on a mylar switch contact layer 5 supported on the upper surface of a horizontal transparent substrate 10. Switch contact layer 5 has an array of printed conductors 9 on its upper surface.

Each of the key caps 4 has an internal recess 22 into which the upper portion 10B of a vertical transparent light pipe 10A extends. Each vertical light pipe 10A is integral with a horizontal transparent substrate 10. Each of the light pipes 10A includes an upper section 10B, the horizontal cross section of which is approximately 125 mils square and which extends approximately 160 mils above the upper surface of plate 10. A lower section 10C of each light pipe 10A also has a horizontal cross sectional area that (as illustrated) is slightly greater than that of upper section 10B. Lower section 10C extends 380 mils below the lower surface of horizontal transparent substrate 10. Each lower section 10C has a 45 degree inclined bottom surface 10D.

A plurality of integral mounting posts such as 15A extend from the bottom surface of horizontal substrate 10. An alignment key or post 15B is provided on the bottom of each of the integral posts 15A that support the horizontal substrate 10. The thickness of transparent substrate 10 is about 60 mils. The integral unit including substrate 10 and light pipes 10A can be composed of transparent ABS plastic.

Figure 3:
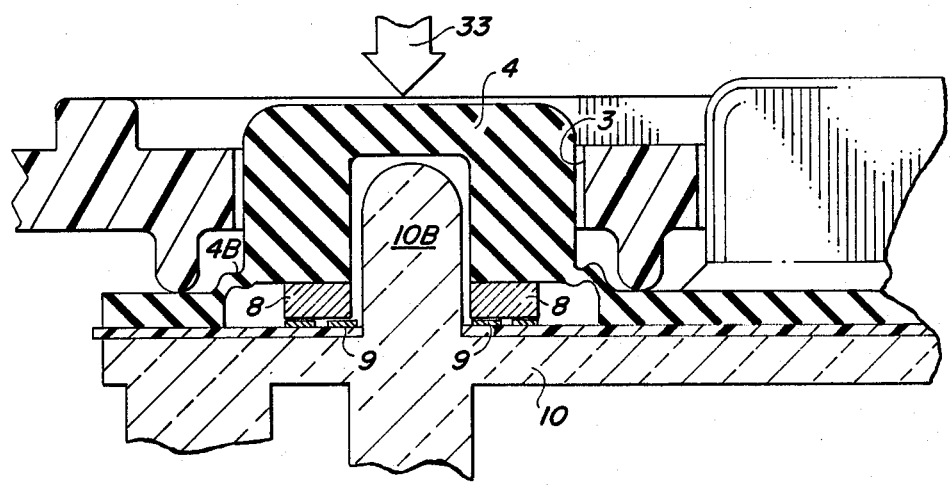
FIG. 3 is a partial section view similar to FIG. 2 showing a depressed key cap.

A conductive shorting pad 8 is attached to the bottom surface of key 4. The shorting pad 8 has an opening essentially coextensive with recess 22 of key cap 4 through which the upper end 10B of light pipe 10A extends. FIG. 3 shows the structure of FIG. 2 when key cap 4 is depressed as indicated by 33 so that the shorting pad electrically contacts printed conductors 9.

A bottom cover plate 6, preferably formed of molded plastic material, is attached to the bottom of housing 1, by means of a plurality of screws such as 29 each extending through a hole such as 32 in a post 12A (FIG. 2) and threaded into a boss (not shown) attached to the vertical inner surface of the peripheral wall of housing 1. Each post 12A has an opening 34 in which a hole and a screw 29 through that hole is recessed. A shoulder 25 on the inner bottom opening of housing 1 abuts the edge of rear cover 6.

A plurality of posts 12B are attached to and integral with the upper surface of rear cover 6. Posts 12B have threaded openings 28 therein to allow bolting the keyboard 100 to a suitable mounting surface.

The closed, raised lip 37 on the upper surface of housing 1 allows "flush mounting" of the unit 100 so that the keys 4 are about flush with a panel surface.

A printed circuit board 7 has a number of square light pipe clearance holes 13 therein, one for each light pipe integral with transparent substrate 10. Printed circuit board 7 also includes a number of alignment holes 14 through which alignment keys 15B on the bottoms of posts 15A extend, so that substrate 10 can be conveniently and precisely aligned with printed circuit board 7.

All of the components of printed circuit board 7 are mounted on the bottom side thereof, so that economical conventional wave soldering techniques can be utilized to effectuate soldering on only one side. (Those skilled in the art know that it is impractical to use automated wave techniques in manufacture of a printed circuit soldering board with components mounted on both sides.) In FIG. 2, reference numeral 27 represents a lead of a light emitting diode (LED) 11 having a right angle mounting base 11A that is attached to the bottom surface of printed circuit board 7. Reference numeral 16 designates a "wave soldered" connection to lead 27.

When light emitting diode 11 is turned on, a horizontal light beam 40 is emitted and passes through the vertical wall of lower section 10C of light pipe 10A, and strikes 45 degree inclined surface 10D of light pipe 10A. Inclined surface 10D acts as a mirror, reflecting the light beam 40 directly upward through light pipe 10A as indicated by 41 and into key cap recess 22. When LED 11 is turned on, transluscent or transparent material of which key cap 4 is composed allows light beam 42 to pass through key cap 4, thereby providing selective backlighting thereof.

As best shown in FIG. 1, the mylar switch contact layer 5 is integral with a mylar ribbon cable 35 by means of which the printed conductors 9 (FIG. 2) are routed around light pipe supporting substrate 10 to a connector (not shown) attached to the bottom side of printed circuit board 7, making electrical contact to various conductors thereon.

Assembly of the described structure involves placing the printed circuit board 7 on the pedestals 12A and attaching it thereto by means of screws 29, aligning the light pipe supporting substrate 10 so that its alignment posts 15B fit into the alignment apertures 14 that are predrilled in the printed circuit board. All of the light pipes 10A then will be properly aligned with the apertures 13 and the earlier mounted right angle light emitting diodes 11. The switch contact layer 5 then is aligned with the light pipes 10A and placed upon the upper surface of light pipe supporting substrate 10. The unitary key cap base 4A with the keys thereon then is aligned with the switch contact layer 5. The LCD display 21 is installed, and the front housing 1 is attached to the rear cover 6.

Thus, it can be seen that a highly reliable, high quality terminal with individually backlit keys thereby is provided. The described structure is economical to manufacture, because all of the components, including the right angle light emitting diodes 11, can be mounted on the bottom surface of printed circuit board 7, allowing economical wave solder manufacturing techniques to be utilized to make the electrical connections on the upper surface of the printed circuit board. The integral transparent substrate 10 and light pipes 10A provide a simple structure that allows selective backlighting of individual keys, is easily aligned to and mounted on the printed circuit board, supports the mylar switch contact layer and the molded key cap and base sheet, supports the downward pressure of the sealing bosses 30, and also supports the forces applied to depress the key caps. Each key cap can be selectively backlit by a LED 11 which has been turned on either in response to a signal generated by shorting pad 8 to printed conductors 9 or in response to a signal received by the unit 100 from a remote source.

While the invention has been described with respect to a number of embodiments, those skilled in the art will be able to make various modifications to the described embodiment without departing from the true spirit and scope of the invention. It is intended that all structures and techniques which are equivalent to those described herein in that they perform substantially the same function in substantially the same way to achieve the same result are within the scope of the invention. For example, the edge of a printed circuit board might be aligned with the keys, in which case the light pipes could pass upward along the edge of the printed circuit board.

I claim:

1. A method of backlighting a keyboard including steps of:
    (a) providing a plurality of keys with lens portions that can pass light;
    (b) providing a plurality of conductive switch contact elements which cooperate to produce switching signals when the keys are respectively depressed;
    (c) supporting a printed circuit board which has a plurality of holes under and in aligned relationship with the plurality of keys, respectively;
    (d) supporting a plurality of light sources on a lower surface of the printed circuit board;
    (e) supporting a plurality of light pipes to receive light beams from the light sources, respectively and conducting the light beams through the holes of the printed circuit board to the lens portions of the keys by means of the light pipes, respectively; and
    (f) turning on a selected one of the light sources to produce a light beam while leaving another of the light sources off, guiding the light beam into one of the light pipes, and conducting the light beam through that light pipe and through the printed circuit board to the lens portion of a corresponding key, thereby selectively backlighting that key.

2. The method of claim 1 including supporting the plurality of light pipes by means of an integral substrate located betweeen the printed circuit board and the keys, each of the light pipes having an upper portion extending to a point near the lens portion of a corresponding key and a lower portion extending through a hole in the printed circuit board to a point near a corresponding light source.

3. The method of claim 2 including providing the switch contact elements on an insulative film and supporting the conductive film on an upper surface of the substrate, and conducting the switching signals from the switch contact elements to the lower surfaces of the printed circuit board by means of a ribbon cable extension portion of the insulative film.

4. The method of claim 3 including molding the keys from a sheet of rubber-like material, and supporting the sheet on an upper surface of the insulative film.

5. The method of claim 4 including providing a housing having an upper surface with key apertures through which the keys respectively extend, and providing a closed inner boss on the housing surrounding each key aperture and forcing each closed inner boss against the sheet of rubber-like material to seal out moisture and dust, and resisting the forces on the closed inner bosses and forces applied to the keys to depress them by means of the substrate.

6. The method of claim 5 including supporting an inclined mirror surface of the lower portion of each light pipe on a side thereof opposed to the corresponding light source, and passing a light beam from the light source through a portion of the light pipe to the inclined mirror surface and reflecting the light beam through the light pipe to the lens portion of the selected key.

7. The method of claim 6 including mounting a plurality of light emitting diodes on a lower side of the printed circuit board by means of right angle mounts so that a lens of each light emitting diode is aimed at the inclined mirror surface of a corresponding light pipe.

8. The method of claim 7 including providing a plurality of support posts on a bottom surface of the substrate, providing a plurality of alignment keys on the respective support posts, providing corresponding alignment holes in the printed circuit board, supporting the support posts on the upper surface of the printed circuit board, and inserting the alignment keys in the alignment holes.

9. The method of claim 8 including mounting the plurality of light emitting diodes by wave soldering.

10. A backlit keyboard comprising in combination:
    (a) a plurality of flexible keys molded from and supported on a rubber-like sheet, each key having a lens portion and a recess aligned with the lens portion;
    (b) a printed circuit board having an upper surface and a lower surface and a plurality of clearance holes aligned with the recesses of the respective keys;
    (c) a substrate disposed above the printed circuit board in spaced relationship thereto;
    (d) an insulative film disposed on the upper surface of the printed circuit board and a plurality of conductive switch contact elements on an upper surface of the insulative film, and a plurality of clearance holes in the insulative film aligned with the clearance holes of the printed circuit board;
    (e) a plurality of light pipes supported by the substrate, each light pipe including an upper section extending upward through a clearance hole in the insulative film into the recess of a corresponding key and a lower section extending downward through a clearance hole in the printed circuit board;
    (f) a plurality of inclined reflective surfaces each supported under the printed circuit board on a bottom of the lower section of each respective light pipe; and
    (g) a plurality of right angle light emitting diodes mounted on the lower surface of the printed circuit board adjacent to each clearance hole thereof, respectively, and aimed through a portion of the lower section of a corresponding light pipe at the inclined reflective surface of that light pipe.

11. The backlit keyboard of claim 10 wherein the substrate is composed of rigid transparent plastic and is integral with the light pipes.

12. The backlit keyboard of claim 11 including means for electrically connecting the switch contact elements to conductors on the lower surface of the printed circuit board.

13. The backlit keyboard of claim 12 including a housing having an upper surface including a plurality of key apertures through which the keys respectively extend, the housing having an upper inner surface and a plurality of closed bosses on the upper inner surface each surrounding a respective key aperture and pressing against an upper surface of the rubber like sheet to form a seal that keeps out moisture and dust.

14. The backlit keyboard of claim 13 including means for supporting the printed circuit board in fixed relationship to the housing, a plurality of alignment holes in the printed circuit board, spacers between the upper surface of the printed circuit board and a lower surface of the substrate supporting the substrate above and parallel to the printed circuit board.

15. The backlit keyboard of claim 14 including alignment means for engaging the alignment holes to align the substrate with the printed circuit board.

16. The backlit keyboard of claim 10 including means for selectivley turning the light emitting diodes respectively on and off.

17. A backlit keyboard, comprising in combination:
   (a) a plurality of keys each with respective lens portion through which light can pass;
   (b) a plurality of conductive switch contact elements which cooperate to produce switching signals when the keys are respectively depressed;
   (c) a printed circuit board having a plurality of holes;
   (d) means for supporting the printed circuit board and the plurality of keys so that the holes are in aligned relationship with the respective keys;
   (e) a plurality of light sources in a lower surface of the printed circuit board;
   (f) a plurality of light pipe means for receiving light beams from the respective light sources and conducting the light beams through the holes of the printed circuit board to the lens portions of the keys;
   (g) means for supporting the light pipe means in aligned relationship to the holes of the printed circuit board and the keys; and
   (h) means for selectively turning the light sources on and off to selectively backlight the keys.

18. The backlight keyboard of claim 17 wherein the light pipe supporting means includes an integral substrate located between the printed circuit board and the keys, each of the light pipe means having an upper portion extending to a proximity of the lens portion of a corresponding key and a lower portion extending through a hole in the printed circuit board to a proximity of a corresponding light source.

19. A method of backlighting a keyboard including steps of:
   (a) providing a plurality of keys with lens portions that can pass light;
   (b) providing a plurality of switches which produce switching signals when the keys are respectively actuated;
   (c) supporting a printed circuit board in aligned relationship with the plurality of keys, respectively;
   (d) supporting a plurality of light sources on a surface of the printed circuit board opposite to the keys;
   (e) supporting a plurality of light pipes to receive light beams from the respective light sources, and conducting the light beams to the lens portions of the keys by means of the respective light pipes; and
   (f) turning on a selected one of the light sources to produce a light beam while leaving another of the light sources off, guiding the light beam into one of the light pipes, and conducting the light beam through that light pipe to the lens portion of a corresponding key, thereby selectively backlighting that key.

20. A backlit keyboard comprising in combination:
   (a) a plurality of keys supported on a rubber-like sheet, each key having a lens portion;
   (b) a printed circuit board having an upper surface and a lower surface and a plurality of clearance holes respectively aligned with the keys;
   (c) a substrate disposed above the printed circuit board in spaced relationship thereto;
   (d) a plurality of switching means for producing switching signals in response to actuation of the keys, respectively;
   (e) a plurality of light pipes supported by the substrate, each light pipe including an upper section extending upward to a point near a corresponding key and a lower section extending downward through a clearance hole in the printed circuit board to a location below the printed circuit board;
   (f) a plurality of inclined reflective surfaces each supported under the printed circuit board on a lower section of each light pipe, respectively; and
   (g) a plurality of right angle light emitting diodes mounted on the lower surface of the printed circuit board adjacent to each clearance hole thereof respectively, and aimed through a portion of the lower section of a corresponding light pipe at the inclined reflective surface of that light pipe.

21. A backlit keyboard, comprising in combination:
   (a) a plurality of keys each with a respective lens portion through which light can pass;
   (b) a plurality of conductive switch contact elements which cooperate to produce switching signals when the keys are respectively depressed;
   (c) a circuit board having a plurality of holes;
   a plurality of light sources on a lower surface of the printed circuit board;
   (e) a plurality of light pipe means for receiving light beams from the light sources respectively, and conducting the light beams through the holes of the printed circuit board to the lens portions of the keys;
   (f) means for supporting the light pipe means in aligned relationship to the holes of the printed circuit board and the keys; and
   (g) means for turning the light sources on and off, respectively, in response to the switching signals to selectively backlight the keys.

* * * * *